UNITED STATES PATENT OFFICE.

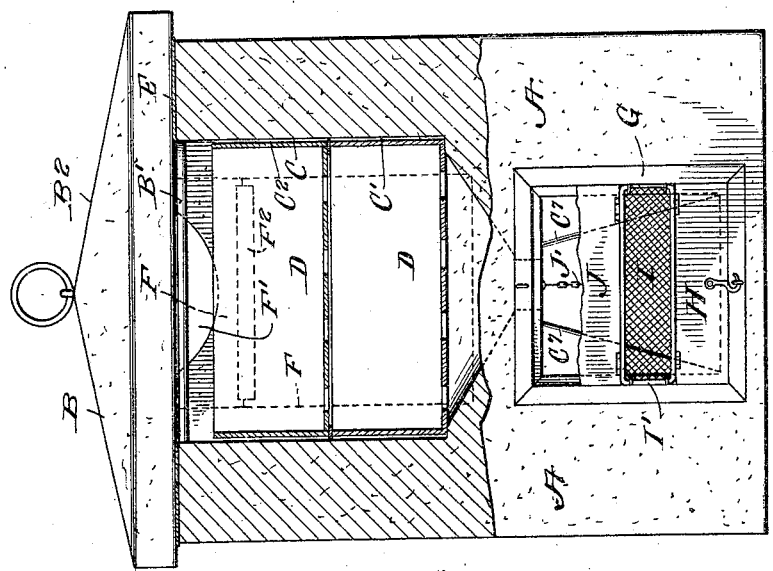
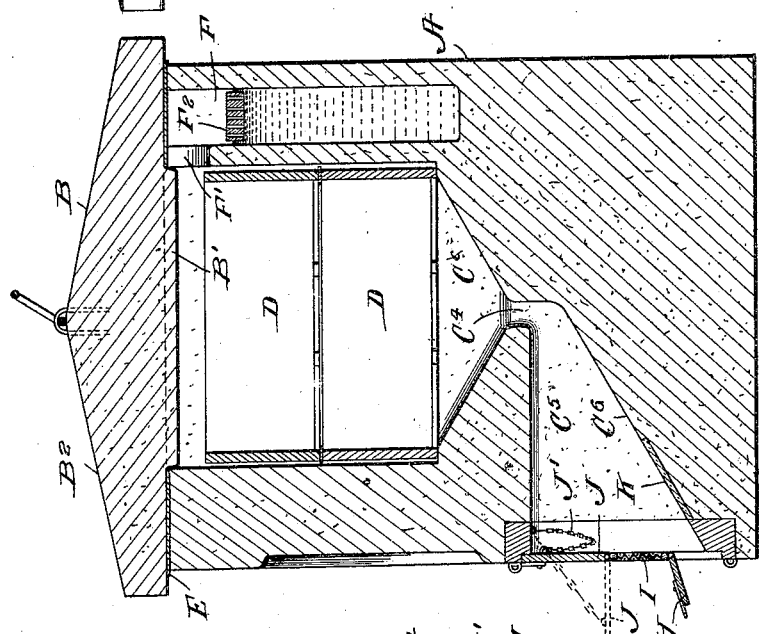
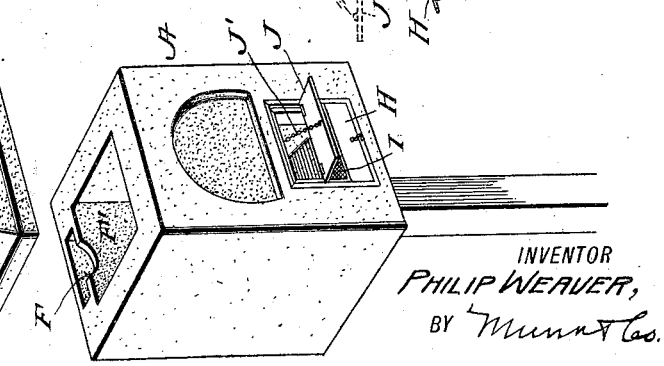

PHILIP WEAVER, OF FORT WORTH, TEXAS.

BEEHIVE.

933,606.

Specification of Letters Patent.　　Patented Sept. 7, 1909.

Application filed December 3, 1908.　Serial No. 465,799.

*To all whom it may concern:*

Be it known that I, PHILIP WEAVER, a citizen of the United States, and a resident of Forth Worth, in the county of Tarrant and State of Texas, have made certain new and useful Improvements in Beehives, of which the following is a specification.

This invention is an improvement in bee hives, and has for an object among others, to provide a bee hive of concrete or cement whose walls will be thick enough to exclude the heat and cold, and whose interior will be large enough to receive any desired form of honey frames and which will afford at its entrance ventilating means, cleaning out means, and means for the passage of the bees into and out of the hive; and the invention consists in certain novel constructions and combinations of parts as will be hereinafter described and claimed.

In the drawings, Figure 1 is a perspective view of a hive embodying my invention, the cover being raised above the body of the hive. Fig. 2 is a vertical longitudinal section of the hive, and Fig. 3 is a front elevation, partly in section.

In carrying out the invention the hive is suitably molded in two sections, a body section A, and a cover B, and the body section A has in its upper portion a chamber C, the lower portion of which at $C'$ is utilized as the bee nest or hatchery, and is of sufficient depth and size to fit the frames, and its upper portion at $C^2$ receives the honey trays D.

The chamber C is open at the top and is closed in practice by the cover B which has a depending portion $B'$ to fit down in the upper end of the chamber, and the cover B rests upon the upper ends of the walls of the body A, a suitable packing or washer E of felt, cotton flannel or other suitable fabric being provided, as shown, to prevent the ingress of insects. The cover projects beyond the sides of the body A as shown in Figs. 2 and 3, and the upper side of the cover at $B^2$ is inclined downwardly toward its outer edge in such manner as to shed water.

Within the rear wall of the body A, I provide a food receptacle F in the form of a pocket, open at its upper end and communicating at such end through a passage $F'$ with the chamber C, to permit the bees to pass from the said chamber C into and out of the food receptacle F. In practice this pocket is supplied with the bee food in liquid form, and a perforated float $F^2$, preferably of wood, is provided to float on the top of the food and prevent the bees from getting into the liquid food, and at the same time permitting them to have access thereto for feeding purposes.

The bottom $C^3$ of the chamber C inclines downwardly toward a centrally contracted inlet opening $C^4$, which communicates with an entrance chamber $C^5$ whose bottom $C^6$ slopes downward toward the inlet opening $C^4$ and whose sides $C^7$, see Fig. 3, also converge toward the opening $C^4$.

The inlet chamber $C^5$ opens through the front of the hive and is supplied with a suitable frame G in the form of a door frame, within which are provided the lower cleaning out door H, the ventilating door I above the door H, and the entrance door J above the ventilating door I. The door J is hinged at its lower edge so it can be lowered to the dotted line position shown in Fig. 2, to form a lighting board for the bees, being supported in this dotted line position by the chain $J'$. This door J can be closed in cold weather to prevent the bees from wandering out and freezing.

The ventilating door I is in the form of a screen door, hinged at one side $I'$ and operating when closed to afford ventilation of the hive, and to prevent the passage thereinto of insects.

The lower door H is hinged at its upper edge and may be opened to let the sweepings of the bees pass out of the door.

As above suggested, the bottom $C^6$ of the inlet chamber is inclined downwardly toward its outer edge to aid the bees in sweeping the wax out of the bottom of the hive, and upon this bottom $C^6$ for a short distance from its lower end I place a glass plate K embedded in the cement and operating to prevent ants, moths, and other insects from climbing into the hive.

From the foregoing it will be noticed that I provide a bee hive having a main chamber, and an entrance chamber, the upper end of the entrance chamber communicating through an inlet opening with the lower end of the main chamber, and the bottom walls of both said chambers inclining downwardly so that there is a constant downward inclination toward the outer end of the entrance chamber, thus enabling the bees to sweep and clean their own hives, and the door construction as before described, operating to prevent ants, roaches and the like as well as robber bees, toads, or lizards from entering the hive.

The honey trays D are usually in practice, made large enough to hold one pound, and the hives may be made of sufficient height to receive one, two or three trays. These trays may be made of one half inch boards with the sides of tin, galvanized iron, or wood, and the bottoms of slatted tin, iron or wood, with oil papers between the edges of the tray to keep the bees from pasting them together.

I claim—

1. A bee hive having a body portion of concrete or cement, and provided in its upper end with a chamber for honey trays and the like, and along side the same with a food receptacle or pocket, and with a passage connecting the said pocket at its upper end with the chamber of the hive, the bottom wall of said chamber inclining downwardly toward an inlet opening, and the hive being provided below and in connection with said inlet opening with an entrance chamber whose base wall inclines downwardly toward its outer end, a glass plate on the base wall of said entrance chamber, a cleaning out door at the lower portion of the outer end of the entrance chamber, a ventilating door above said cleaning out door, and a door above said ventilating door and adapted to be lowered to form a lighting platform, and a cover for the body of the hive, all substantially as and for the purposes set forth.

2. A bee hive comprising a body portion of concrete or cement having a chamber for honey trays and the like, the bottom wall of said chamber being inclined downwardly toward the inlet opening, and an entrance chamber being provided below the said first chamber and communicating at its inner upper end through the inlet opening with said chamber, the base wall of said entrance chamber inclining downwardly toward its outer end, and a closure for the outer end of the entrance chamber, substantially as set forth.

3. A bee hive of concrete or cement having in its upper end a chamber for honey trays and the like, and provided in its side wall along side said chamber with a food receptacle or pocket and with a passage connecting said pocket with the honey tray chamber, and a cover for the hive, extending over the food pocket, substantially as set forth.

4. A bee hive having a main or honey tray chamber, and an entrance chamber communicating at its inner upper end with the said honey tray chamber, combined with a cleaning out door at the bottom of the outer end of said entrance chamber, a ventilating door above said cleaning out door, and an entrance door above the ventilating door substantially as set forth.

5. A bee hive having a main or honey tray chamber, and provided along side the same with a food receptacle or pocket and with a passage connecting the upper end of said pocket with the main chamber, and a cover extending over the said tray chamber and food pocket substantially as set forth.

6. A bee hive having a honey tray chamber the bottom of which is inclined downwardly toward an inlet opening, and an entrance chamber below the honey tray chamber and communicating at its inner upper end through the inlet opening with said chamber, the base wall of said entrance chamber inclining downwardly toward its outer end, and a closure for the outer end of the entrance chamber.

PHILIP WEAVER.

Witnesses:
T. R. HIGH,
PETE ARNOLD.